Dec. 29, 1936.　　　　S. B. FIELD　　　　2,066,260
WRAPPING MACHINE
Filed Nov. 3, 1934　　　10 Sheets-Sheet 1
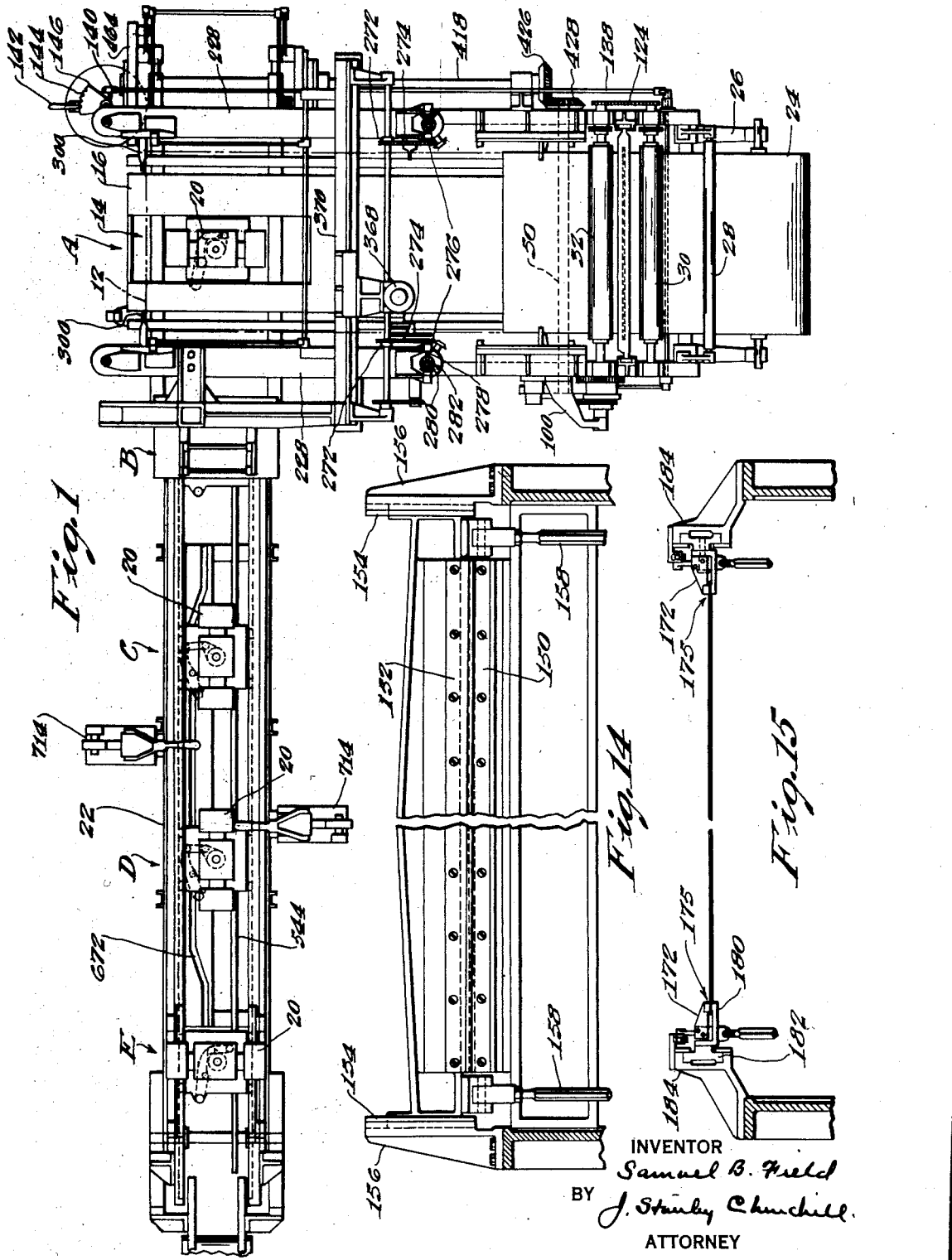
INVENTOR
Samuel B. Field
BY J. Stanley Churchill
ATTORNEY

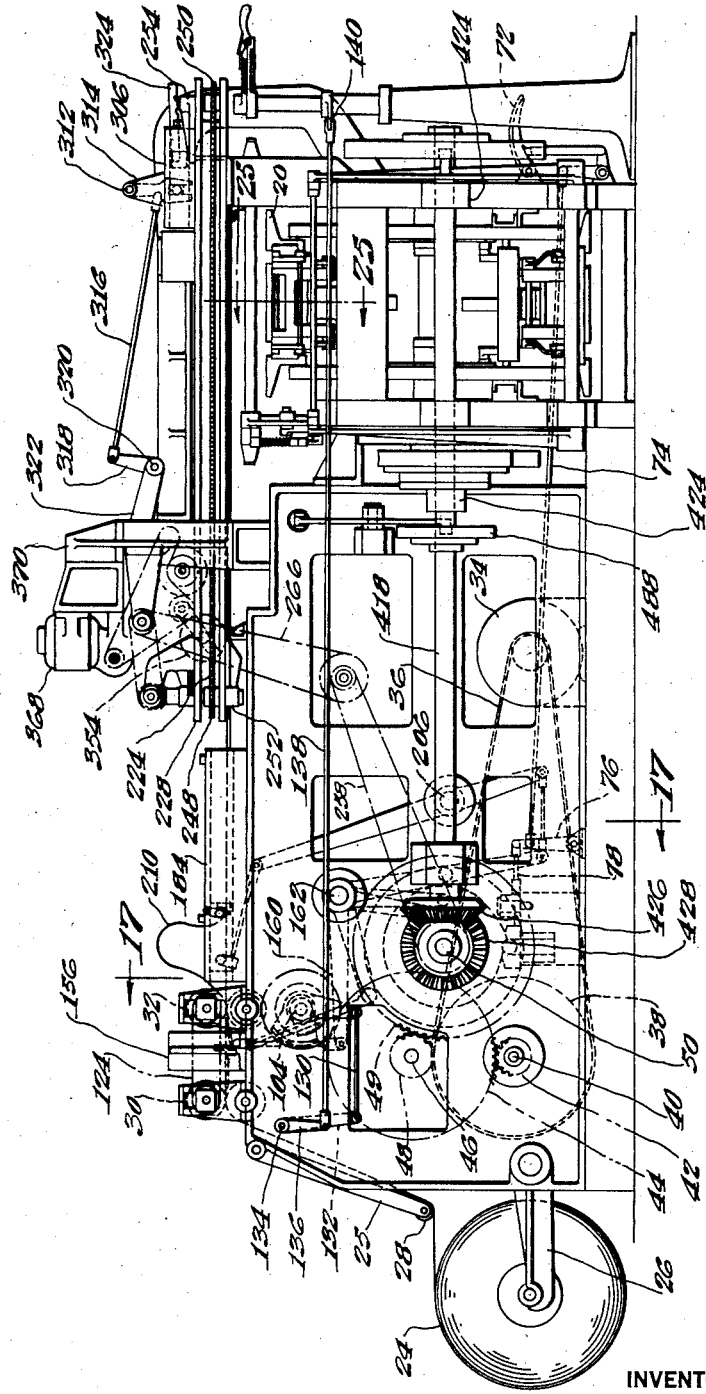

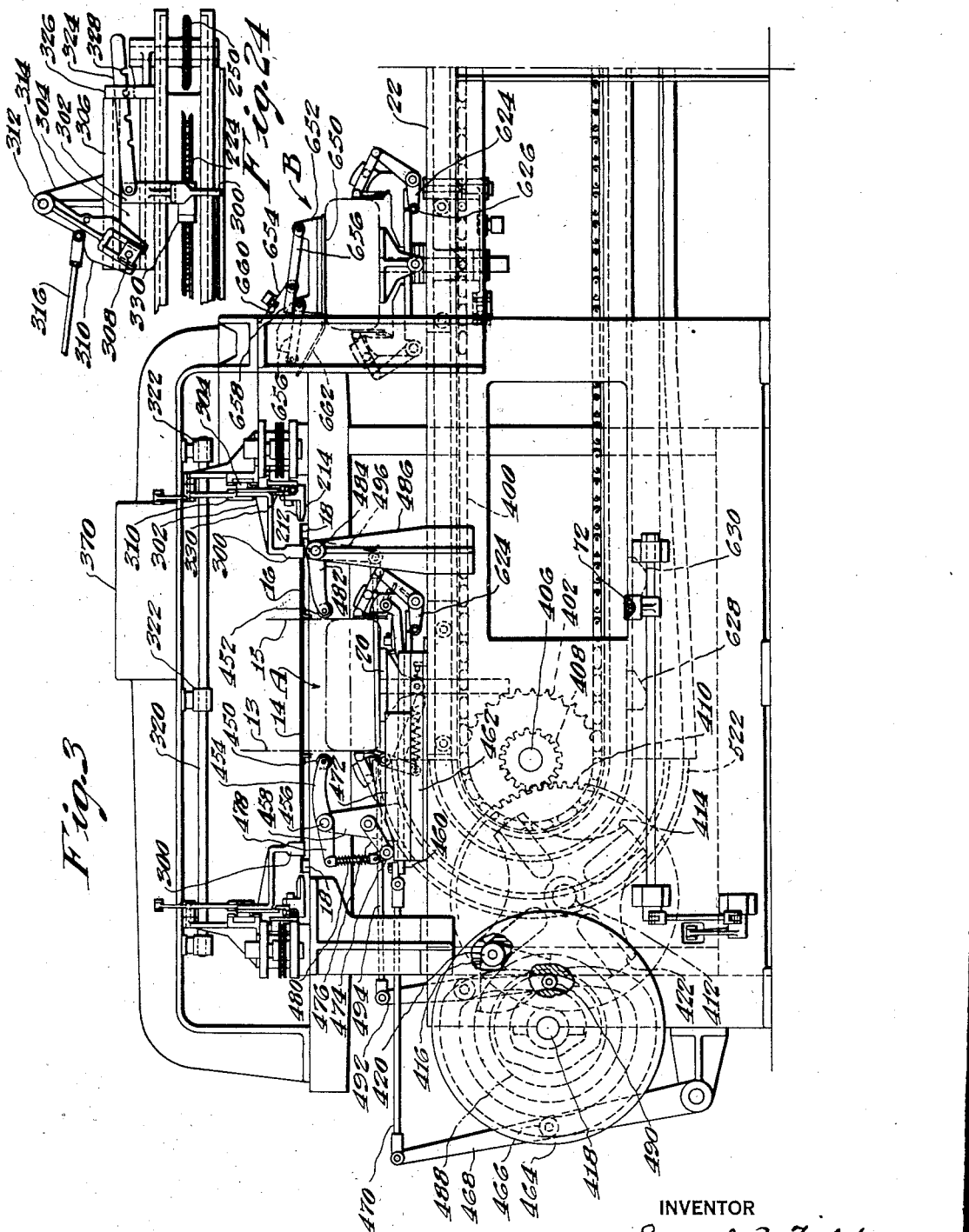

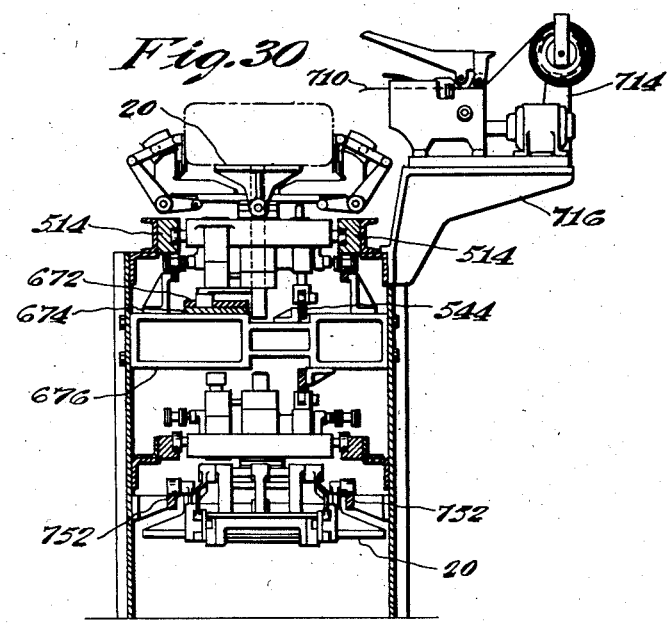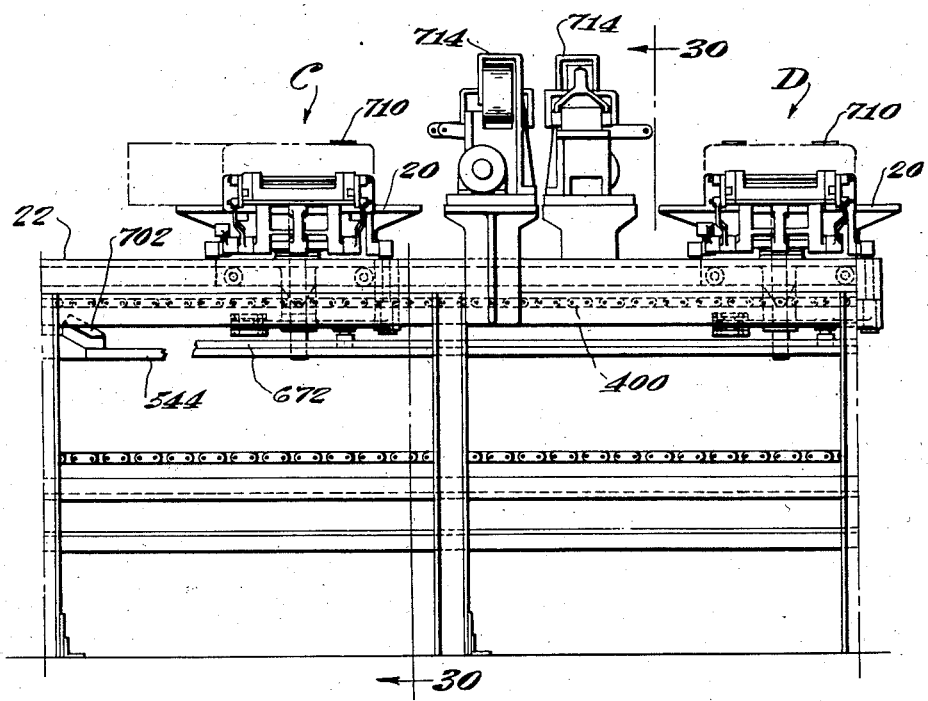

Dec. 29, 1936.   S. B. FIELD   2,066,260
WRAPPING MACHINE
Filed Nov. 3, 1934   10 Sheets-Sheet 5

INVENTOR
Samuel B. Field
BY J. Stanley Churchill
ATTORNEY

Dec. 29, 1936.  S. B. FIELD  2,066,260
WRAPPING MACHINE
Filed Nov. 3, 1934  10 Sheets-Sheet 6
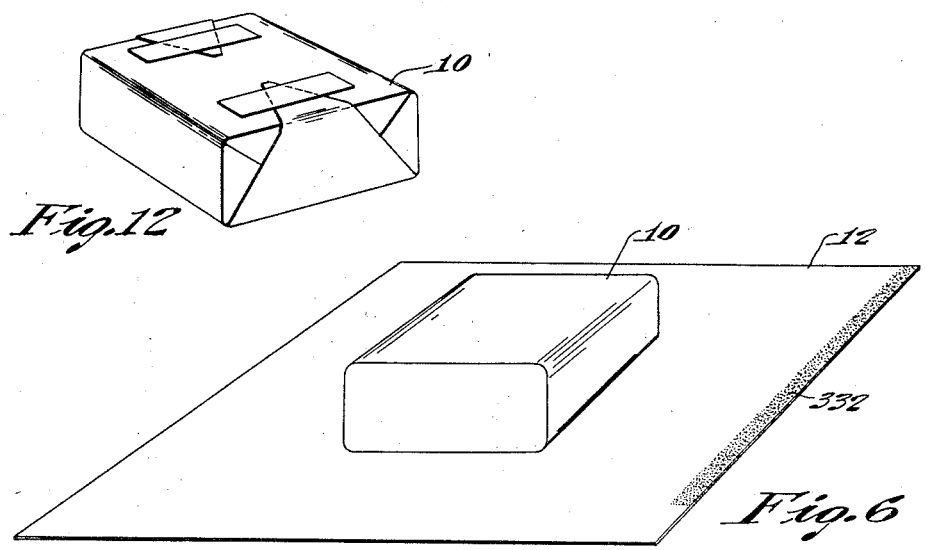
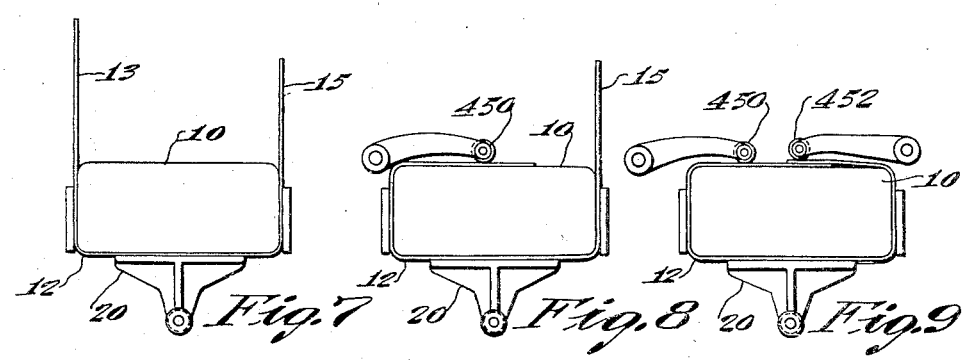
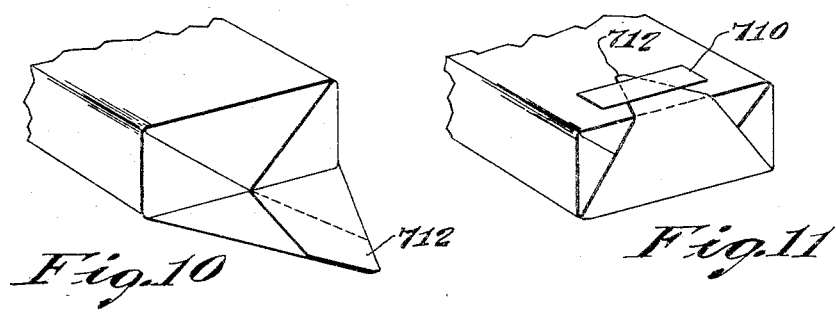
INVENTOR
Samuel B. Field
BY J. Stanley Churchill
ATTORNEY

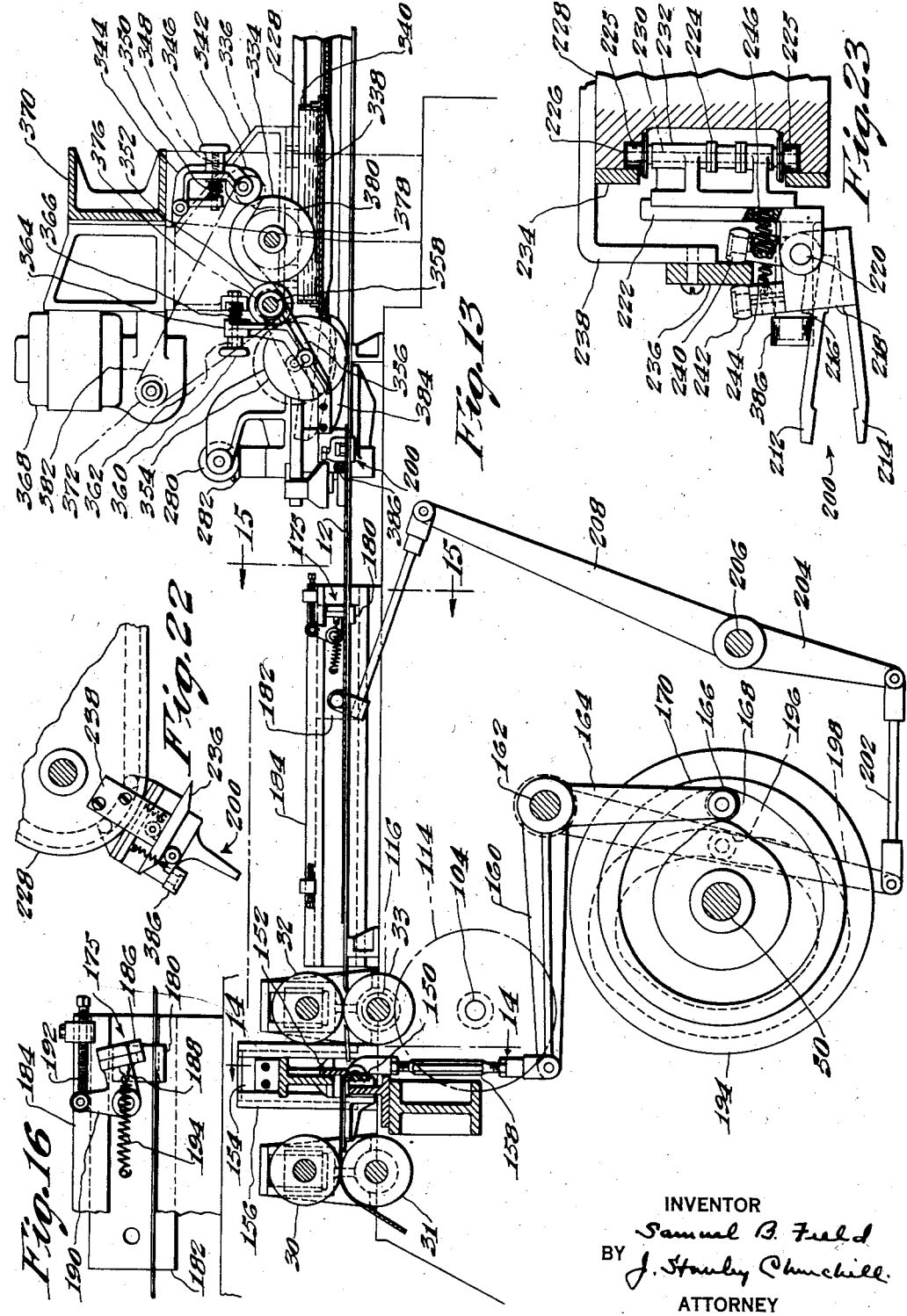

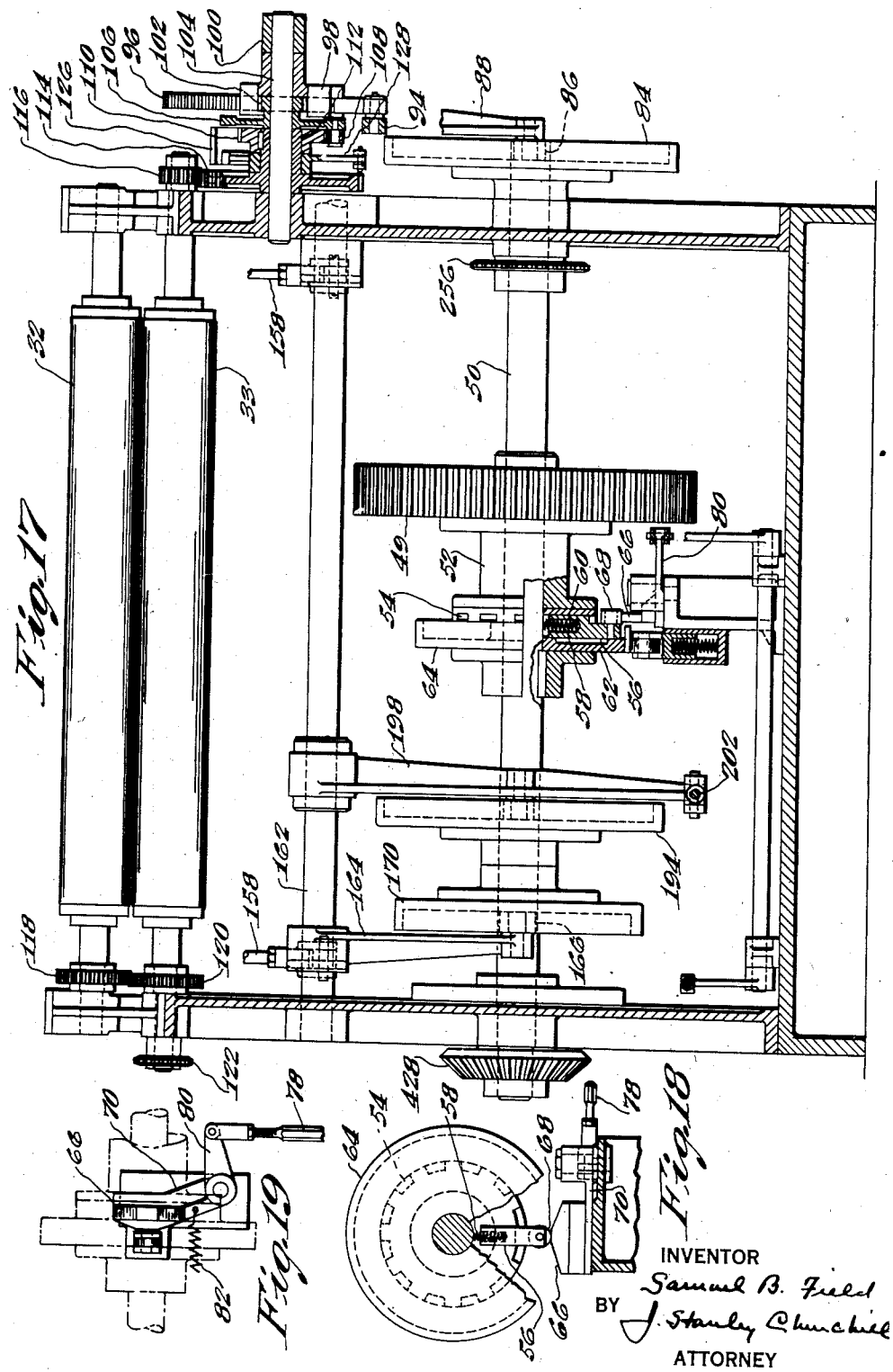

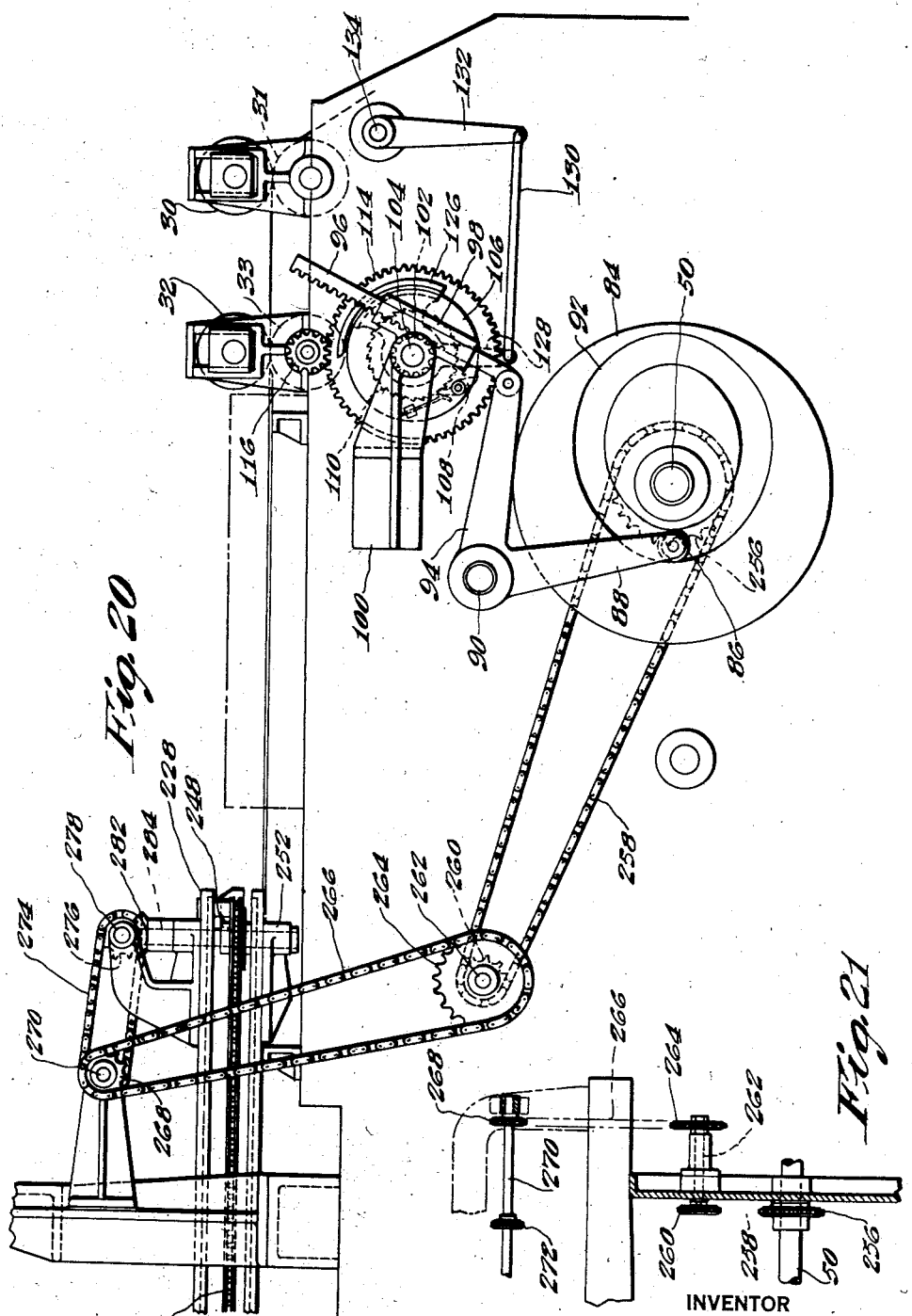

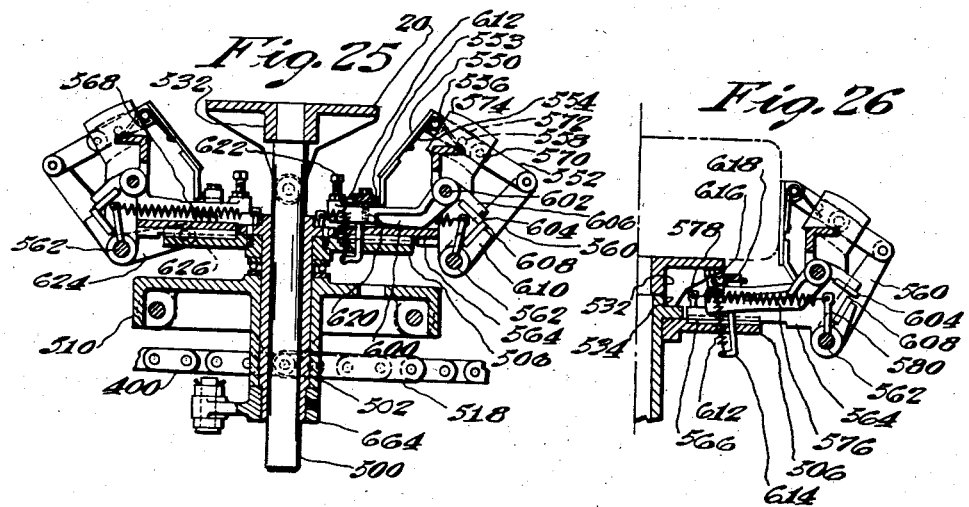
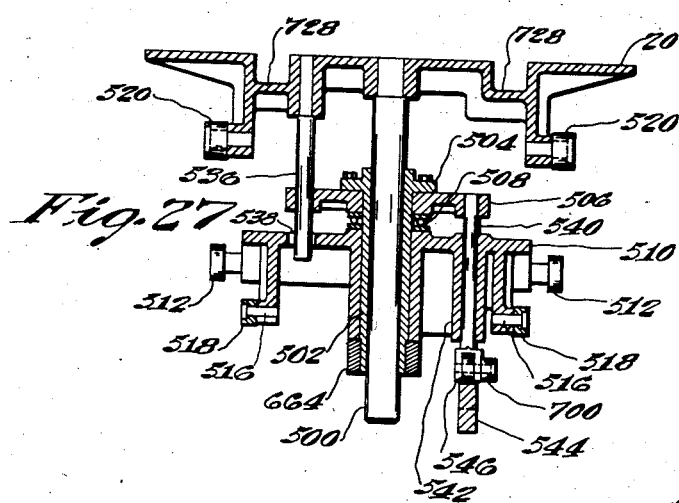
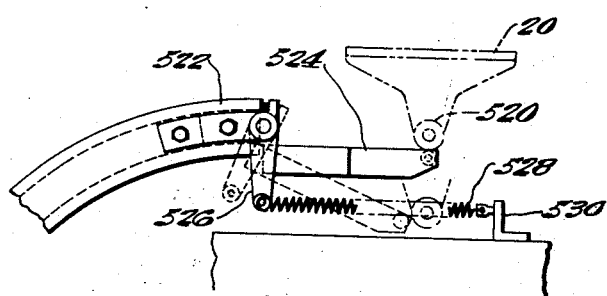
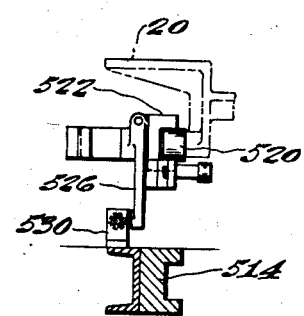

Patented Dec. 29, 1936

2,066,260

UNITED STATES PATENT OFFICE 2,066,260

WRAPPING MACHINE

Samuel B. Field, Holbrook, Mass., assignor to Naumkeag Steam Cotton Company, Salem, Mass., a corporation of Massachusetts Application November 3, 1934, Serial No. 751,354

14 Claims. (Cl. 93—7)

This invention relates to a wrapping machine.

In general, the object of the invention is to provide a novel and improved wrapping machine which is particularly designed to handle and wrap heavy and bulky articles such as bolts of cloth, blankets, sheets, table cloths, and the like when folded and piled to form a bulky and heavy mass. In practice, the machine is particularly designed to wrap such articles to form a commercial package containing a folded and piled bundle of a dozen sheets, blankets, table cloths, and the like. The present machine is designed to facilitate the handling of the heavy and bulky articles in such a manner as to relieve the operator from the fatigue caused by the relatively heavy weight of the articles being wrapped and to thereby enable a much larger number of articles to be wrapped at a minimum expense.

With this object in view and such others as may hereinafter appear, the invention consists in the wrapping machine and in the various structures, arrangements and combinations of parts hereinafter described and particularly defined in the claims at the end of this specification.

Figure 31:
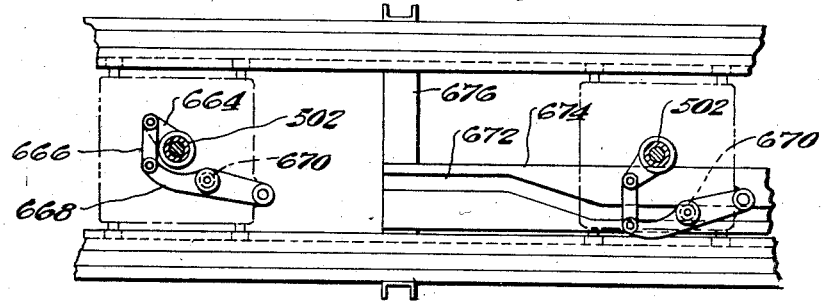
Figure 5:
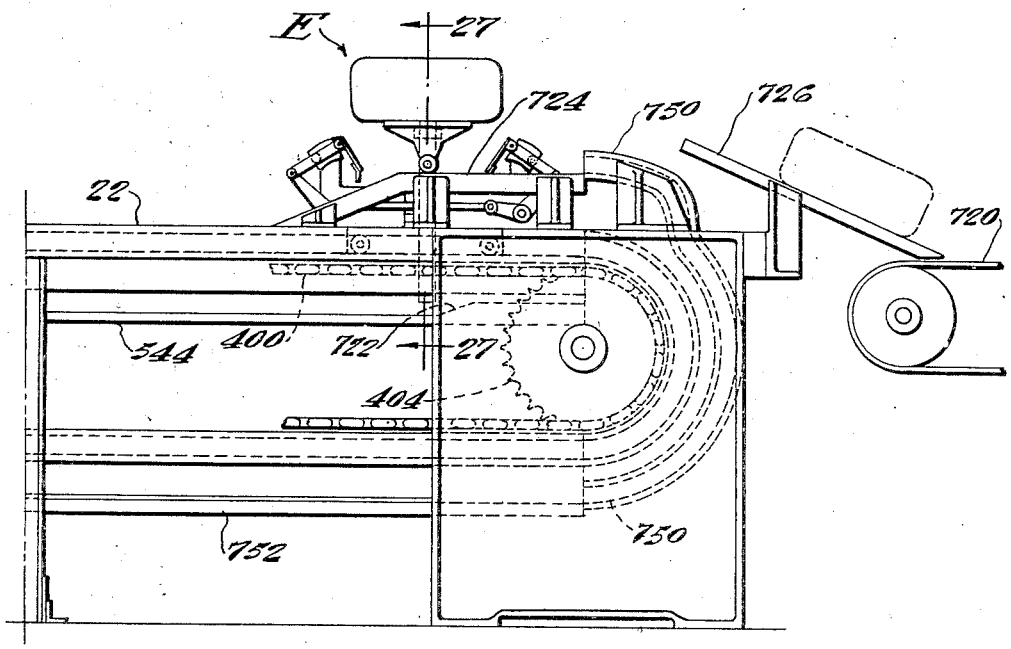

In the drawings illustrating the preferred embodiment of the invention, Fig. 1 is a plan view of the machine; Fig. 2 is a side elevation viewed from the right of Fig. 1; Fig. 3 is a partial front elevation showing the folding station and one section of the conveyor; Fig. 4 is a front elevation of the middle section of the conveyor; Fig. 5 is a front elevation showing the delivery end of the conveyor; Fig. 6 is a perspective view of a sheet of wrapping paper and the article in position to be wrapped; Figs. 7, 8 and 9 are details illustrating the successive steps in the folding of the wrapping sheet of the article; Figs. 10 and 11 are perspective views illustrating the end folds of the wrapper; Fig. 12 is a perspective view of the completely wrapped article; Fig. 13 is a longitudinal section of the sheet feeding rolls, the cut-off knife and the adhesive applying rolls; Fig. 14 is a sectional view on the line 14—14 of Fig. 13; Fig. 15 is a sectional view on the line 15—15 of Fig. 13; Fig. 16 is an enlarged detail of the transfer fingers; Fig. 17 is a cross-sectional view on the line 17—17 of Fig. 2; Figs. 18 and 19 are details in elevation and plan illustrating the one revolution clutch to be referred to; Fig. 20 is a side elevation of a portion of the machine with parts omitted illustrating a portion of the driving mechanism to be referred to; Fig. 21 is a sectional view illustrating the driving mechanism for the gripper chains; Figs. 22 and 23 are details in plan and sectional elevation, respectively, of the gripper members; Fig. 24 is a detail of the wrapper stop and the adjustment therefor; Fig. 25 is a sectional view on the line 25—25 of Fig. 2; Fig. 26 is a similar view to that shown in Fig. 25 with parts in different positions of operation; Fig. 27 is a cross-section taken on the line 27—27 of Fig. 5; Figs. 28 and 29 are front and end views, respectively, illustrating details of the article supporting mechanism and operation thereof; Fig. 30 is a sectional view of the conveyor on the line 30—30 of Fig. 4; and Fig. 31 is a partial plan view of the mechanism for rotating the article supporting member.

In general, the present invention contemplates the provision of a machine which is particularly designed to handle and effect the wrapping of bulky and heavy articles which have heretofore presented serious difficulty in the economical wrapping thereof by hand, because of the fact that the excessive weight of the article has made it impossible for operators to manually wrap the articles in a rapid manner over a period of a working day. As an example of such heavy and bulky articles which the present machine is designed to wrap I may mention the piles of blankets, sheets, table-cloths, bolts of cloth, and similar heavy and bulky articles which are required to be wrapped after their manufacture in order to provide a commercial package for shipment to the retail stores. In its preferred form the invention contemplates a machine in which provision is made for enabling an operator to dispose the articles one at a time upon successive wrapping sheets which have been fed in operative position over a die by sheet feeding mechanism which functions preferably to form the individual wrapping sheets from a supply roll thereof. During the passage of the article and wrapper through the die, the wrapper is partially wrapped about the article, and thereafter provision is made for effecting the wrapping of the remainder of the wrapper about the article and to leave the opposite ends thereof in an unfolded condition. The partially wrapped article is then conveyed through successive stations, preferably by an intermittently operating conveyor and the article disposed at such stations in such manner as to facilitate the manually folding of the end portions of the wrapper and the fastening of the same to the surface of the wrapped article to form the completely wrapped article. During the passage of the article through the machine and while the various folding operations are being performed, the weight of the article is supported by the machine and the operations of manually folding the end portions of the wrapper may be performed by the operators in a rapid manner and without experiencing undue fatigue. Provision is made for enabling the operator to efficiently effect the adjustment of sheet feeding mechanism during the operation of the machine to thereby enable the machine to be rapidly adapted to changes in the sizes and numbers of the articles such as sheets which are to be included in the single wrapped package. The arrangement of conveyors and the manner in which the article is supported during the wrapping and handling thereof by the machine is such as to facilitate the performance upon the article during its passage through the machine of the manual end folding operation in a manner most convenient for the operators. As a result, by means of the present machine the wrapping of these heavy articles whose wrapping has heretofore presented such a serious problem to the manufacturer may be accomplished in a rapid convenient manner, with savings, as compared to manual wrapping, of many thousands of dollars annually.

Referring now to the drawings, the different features of the invention have been illustrated as embodied in a machine for wrapping a plurality of folded and piled articles 10 such as sheets in a paper wrapper 12. As herein shown, the article to be wrapped is positioned manually by an operator upon a previously positioned wrapping sheet 12 permitted to descend by gravity through a die 14 formed in a plate 16 supported upon a suitable framework 18 whereby during the descent of the article and wrapper through the die a partial wrapping of the wrapper about the article is effected and the wrapper and article caused to assume the position shown in Fig. 3, being supported upon one of the article supporting members 20 upon which it is supported during the subsequent operations of folding the remaining portions of the wrapper about the article. The article supporting member 20 is as will be described mounted upon and arranged to be intermittently moved by an elongated conveyor 22 and presented to successive stations where the projecting and unfolded ends of the wrapper are subsequently manually folded and the successive steps in the operation to form a completely wrapped package are performed prior to the delivery of the completely wrapped package from the machine at the delivery end thereof.

In order to position the wrapper 12 in a predetermined position above the die 14, the machine may and preferably will be provided with automatic mechanism for withdrawing a continuous web of the wrapping paper or material from a supply roll 24 operatively supported in suitable brackets 26 forming a part of the machine frame and for cutting off a predetermined length thereof to form the individual wrapping sheet. The individual wrapping sheet thus formed is then fed by the sheet feeding mechanism into position over the die. Referring now to Figs. 1, 2, 13, 14, 15 and 16, the web of wrapping material is withdrawn from the supply roll 24 under a suitable tensioning bar 25 and roll 28 and delivered between two sets of positively driven feed rolls 30 and 32. During the passage of the sheet from one set of feed rolls 30 to a second set of feed rolls 32, provision is made for severing the web so that the end section thereof forms a wrapping sheet.

The feed rolls 30 and 32 are arranged to be driven from a driving motor 34 through a belt connection 36 to a driving pulley 38 mounted upon and secured to a counter-shaft 40 journalled in suitable bearings in the machine frame. The shaft 40 is provided with a pinion 42 arranged to mesh with a large gear 44 mounted upon a second counter-shaft 46 also journalled in suitable bearings in the machine frame. The second counter-shaft 46 is also provided with a pinion 48 arranged to mesh with a large gear 49 loosely mounted on the main driving shaft 50, and provision is made for effecting the rotation of the shaft 50 through one revolution under the control of the operator. For this purpose, and as illustrated in Fig. 17, the large gear 49 is provided with a hub 52 having a plurality of radial slots 54 in the periphery thereof into one of which a dog 56 is adapted to fall when urged so to do by a spring 58 received within a hole 60 bored in the dog 56 and the upper end of which bears within the shaft 50. The dog 56 is mounted to slide in guideways 62 in a disk 64 keyed to the shaft 50 constituting the second or driven member of the one revolution clutch and the dog is normally elevated into a disengaging position by a cam 66 adapted to be positioned beneath a roller 68 mounted on the dog. The cam 66 is formed on one arm 70 of a bell crank, see Fig. 19, and is arranged to be oscillated into the path of the bottom of the dog and from the path of the dog by connections from an operating foot treadle 72 at the front of the machine, connecting rod 74, lever 76, and link 78, the end of which is connected to the second arm 80 of the bell crank, as shown in Fig. 19. As a result, when the operator depresses the foot treadle 72, the cam 66 is swung out of the path of the bottom of the dog 56, thereby permitting the dog to fall into one of the slots 54 and thereby operatively connecting the two portions of the one-revolution clutch so that the driving shaft 50 is turned in one revolution. When the operator releases the treadle 72, a suitable spring 82 is arranged to return the cam into the path of the dog, and thereby disengage the clutch.

Referring now to Figs. 17 and 20, when the shaft 50 is thus driven in one revolution, provision is made for positively driving the wrapper feed rolls 30 and 32, and as herein shown a closed cam 84 is mounted upon and secured to the shaft 50 to rotate therewith, and a cam roll 86 mounted upon one arm 88 of a bell crank pivoted upon a stud 90 in the machine frame is arranged to ride in the cam path 92. The second arm 94 of the bell crank has pivotally connected to it a rack 96 arranged to slide in suitable guides 98 in a bracket 100 also attached to the machine frame, and the rack 96 is arranged to engage a pinion 102 loosely mounted upon an elongated stud 104 secured to the machine frame and projecting outwardly therefrom, see Fig. 17. The pinion 102 has formed as a part thereof a pawl carrying disk 106 in which a pawl 108 is pivotally mounted to oscillate therewith as the pinion 102 is rocked back and forth by the movements of the rack 96 under the influence of the actuating cam 84. The pawl 108 is designed to cooperate with the teeth of a ratchet 110 keyed to a sleeve 112 formed as a part of a gear 114, both the sleeve and gear being loosely mounted upon the stud 104. The gear 114 is arranged to mesh directly with a pinion 116 on the outer end of one of the lower wrapper feeding rolls 33. With this arrangement, during the descent of the rack 96, viewing Fig. 20, the pawl 108 is caused to advance the ratchet 110 and hence to rotate the gear 114 through a predetermined stroke. All of the wrapper feed rolls are operatively connected together, one set of rolls being connected by the cooperating gears 118 and 120, as shown in Fig. 17, and the second set of rolls being driven through the sprocket 122 and chain connections 124 from the first set of rolls, and the rolls 30 and 31 of the second set being likewise geared together. In order to adjustably control the extent to which the feed rolls are rotated at each revolution of the one revolution shaft 50, a shield member 126 loosely mounted upon the sleeve 112 and having a portion adapted to disengage the tail of the pawl 108 to effect its disengagement from the teeth of the ratchet 110 is arranged to be positioned to control the effective stroke of the pawl 108 through connections including an arm 128 formed as a part of the shield member 126 connected by a link 130 to a lever 132 mounted upon a rock shaft 134 extended transversely through a portion of the machine frame. The rock shaft is connected at its second end by a lever connection 136 and a connecting rod 138 to one arm 140 of a bell crank pivotally mounted upon the machine frame, the second arm 142 of the bell crank constituting a handle and being designed to cooperate with successive locking notches 144 in a stationary segment 146 attached to the machine frame, and as a result the operator is permitted to regulate the position of the shield 126 by movement of the handle 146 into one of the several notches 144.

As illustrated in Figs. 2, 13 and 14, the machine is provided with cutting mechanism for cutting the end length of the wrapping web to form an individual wrapping sheet, and as herein shown the cutting mechanism includes a stationary cutter member 150 and a movable cutter member 152, the latter being mounted to slide in suitable guideways 154 in brackets 156 bolted to the machine frame and arranged to positively move into and from cutting position by duplicate sets of connections, including connecting rods 158 attached at their upper ends to the movable cutter 152 and at the lower ends to lever arms 160 secured to a cross shaft 162 journalled in suitable bearings in the machine frame. One of the lever arms 160 has connected to it a cam arm 164 provided upon its end with a cam roll 166 arranged to ride in a cam path 168 in an operating cam 170 upon the main drive shaft 50, as illustrated in Fig. 17, and as a result of this construction, at each revolution of the main drive shaft 50 the movable cutter 152 is moved into cutting position and cooperates with the stationary cutter 150 to cut the wrapping web and form the individual wrapping sheet 10.

After the individual wrapping sheet has thus been severed from the wrapping web, provision is made for transferring it by positively operating transferring members 175 to deliver the sheet into a position to be gripped by gripping members 200 forming a part of a separate sheet feeding mechanism to be described. As illustrated in Figs. 13, 15 and 16, the machine is provided with two sets of transferring members 175 designed to engage and grip each side of the sheet at a point intermediate the ends thereof. Each set of transferring members 175 includes a stationary gripping member 180 mounted upon a slide 182 adapted to be reciprocated in suitable guideways 184 at each side of the machine and also a movable gripping member 186 mounted upon one arm 188 of a bell crank pivoted to the slide 182, and the second arm 190 of which is adapted to be engaged by adjustable stop members 192 at each end of the guideways in order to effect the movement of the pivoted and movable gripping member 186 from an inoperative to an operative gripping position. A spring 194 having one end attached to the slide 182 and the second end attached to the movable gripping member 186 is so arranged as to hold the movable gripping member in either gripping or non-gripping position, as will be apparent from an inspection of Figs. 13 to 16. The slides 182 are arranged to be reciprocated in their guideways 184 by an actuating cam 195 mounted upon the main driving shaft 50 through connections including a cam roller 196 on a cam arm 198 pivoted upon the cross shaft 162, a link 202, an arm 204 secured to a rock shaft 206, as shown in Fig. 13. The rock shaft 206 has connected to it two sets of arms 208 connected at their upper ends to the slides 182 at opposite sides of the machine, so that during the operation of the machine and in timed relation to both the web feeding and the cutting operation the slide 182 and transfer members 175 are reciprocated back and forth. The timing between the movements of the transfer members 175 and the revolutions of the feed rolls 30 and 31 of the wrapper feeding mechanism are preferably such that after each sheet has been severed and engaged by the transfer members the second set of wrapper feeding rolls 32 and 33 operates to deliver the sheet at a speed greater than the speed at which the sheet is being moved by the transfer mechanism, and as a result, as illustrated in Fig. 2, a loop 210 is formed in the sheet in order to compensate for variations in the desired length of the wrapping sheet. In other words, for wrapping some types of articles a longer wrapping sheet is required than in other instances and the foregoing arrangement involving the formation of the loop enables the predetermined and definite movement of the transfer mechanism to be utilized to effect the transfer of these wrapping sheets of varying lengths.

After the sheet has been thus transferred by the transferring members 175 previously described, the forward end of the sheet will occupy a position such as to enable it to be engaged and gripped by two positively operated gripping members 200 by which the movement of the sheet is continued until the forward end of the sheet comes to rest against two stop members 300 positioned with relation to the die 14 above referred to, so as to properly position the sheet over the die. As best illustrated in detail in Figs. 13, 22 and 23, each gripping member 200 includes two movable gripping jaws 212 and 214 mounted upon blocks 216 and 218 pivoted upon a pin 220, and the pin is supported in a bracket 222 mounted upon a conveyor chain 224 and guided in its movement by rollers 225 travelling in guideways 226 formed in an elongated bracket 228 comprising a part of the machine frame. The rollers 225 are mounted upon the upper and lower ends of pins 230 which extend through hubs 232 formed in the bracket 222 and through the links of the chain 224, and are held in place by gibs 234 upon the surface of the bracket 228, the construction being illustrated in Fig. 23.

In order to operate the gripping members 200 a cam member 236 secured to a strap 238 carried by the bracket 228 is disposed in position to effect the opening of each set of gripping jaws 212 and 214 by the cooperation of rollers 240 and 242 carried by the blocks 216 and 218 with the cam 236 and when the rollers leave the cam, a tension spring 244 serves to close the lower jaw 214 while a compression spring 246 serves to close the upper jaw 212. The jaws are opened again at the delivery end of their travel by a second cam member 330 comprising a duplicate of the cam member shown in Fig. 23.

The chains 224 upon which the gripping members 200 are mounted are arranged to run around sprockets 248 and 250 mounted in suitable brackets 252 and 254 forming a part of the machine frame and one set of sprockets 248 comprising the driving sprocket for the chains. The driving sprockets 248 are arranged to be driven from the main driving shaft 50 through connections including a sprocket 256 on the drive shaft 50, a sprocket chain 258, and a second sprocket 260 upon a short shaft 262, see Figs. 1, 20 and 21. The short shaft 262 is provided on its outer end with a sprocket 264 over which a second sprocket chain 266 runs and at its upper end the sprocket chain runs over a sprocket 268 upon a cross shaft 270. The cross shaft is provided with two sets of sprockets 272 over which sprocket chains 274 run to connect the cross shaft 270 with sprockets 276 upon a second set of short shafts 278. These short shafts 278 are provided with beveled gears 280 which cooperate with beveled gears 282 on vertical studs 284 upon which the driving sprockets 248 are mounted, as illustrated in Fig. 20.

In order to adjustably position the stop members 300 with relation to the die 14 in order to position different lengths of wrapping sheets in predetermined position with relation to the die, provision is made for enabling the operator to move the stop members 300 toward and from the die. As herein shown, each stop member 300 is mounted upon a bracket 302 attached to a slide 304 arranged to slide in guides 306 forming a part of the machine frame. Each slide member 304 is provided with a stud 308 over which the forked end of levers 310 mounted upon studs 312 secured in brackets 314 formed integrally with the guideways 306 is arranged to hang and the two slides 304 and stop members 300 are connected together through links 316 attached to levers 318, both of which are mounted upon and secured to a cross shaft 320 journalled in brackets 322 attached to the machine frame. One of the slides 304 is provided with a pivoted notched handle 324 to permit the operator to slide the slide 304 back and forth and thereby adjustably position both stop members 300 with relation to the edge of the die 14. A locking plate 326 is mounted upon the machine frame to fit into one of the notches 328 in the under surface of the handle 324 and thereby retain the parts in any desired position of adjustment. In this manner the operator may conveniently adjust both stop members by the single movement of the handle. The cam piece 330 previously referred to also attached to the slide member 304 effects the opening of the gripper jaws 212 and 214 to release the wrapper 12 immediately prior to the engagement of the wrapper with the stop 300.

In order to apply a strip of adhesive 332 to one of the marginal edges of the wrapping sheet 12, as illustrated in Fig. 6, the machine is provided with an adhesive applying mechanism herein shown, see Fig. 13, as including a glue roll 334 mounted in brackets 336 forming a part of the machine frame and arranged to run in a bath of glue 338 within a glue pan 340 also supported upon said brackets. The glue roll 334 has cooperating with it a distributing roll 342 mounted in a pivoted bracket 344 and held in adjusted positions in contact with the glue roll by a hand wheel 346 screwed upon the end of a threaded pin 348 extended through a hole in the pivoted bracket 344 and a spring 350 interposed in the bracket and a part of the machine frame, so that by screwing down the hand wheel 346 the operator is enabled to control the thickness of the film of glue or other adhesive which remains upon the glue roll 334 after passing by the distributing roll 342. The glue roll 334 also has cooperating with it a transfer roll 352 by which the film is transferred to an adhesive applying roll 354 mounted in a lever 356 pivoted upon the shaft 358 of the transfer roll 352, and which is also provided with an adjustment including a hand wheel 360 screwed upon the end of a threaded rod 362 projecting through an arm 364 upstanding from the lever 356 and also having a spring 366 interposed between the arm 364 and a part of the machine frame to thereby permit the operator to screw down the hand wheel 360 and control the pressure with which the glue applying roll 354 applies the film of glue to the marginal edge of the wrapping sheet 12 fed thereunder.

As illustrated in Fig. 13 the glue roll 334 and transfer roll 352 are preferably driven independently of the main drive and as herein shown a sprocket 372 on a motor and speed reducing unit 368 mounted on the cross frame 370 drives the sprockets 376, 378 and idler sprocket 380 through a chain 382.

In order to permit the gripping members 200 to pass beneath the adhesive applying roll 354 without contacting therewith, in order to prevent the application of adhesive to the gripping members 200, the pivoted lever 356 is provided at its lower end with a cam member 384 with which a roll 386 formed on a part of the gripper supporting bracket 222, as illustrated in details in Figs. 22 and 23, is adapted to cooperate to lift the lever 356 and adhesive applying roll 354 as well as the cam 384 from the full to the dotted line positions of Fig. 13, thereby permitting the gripper 200 to pass beneath the adhesive applying roll 354 and preventing the application of adhesive to the gripper. After the gripper 200 has passed, the cam 384, upon leaving the roll 386 permits the adhesive applying roll 354 to again return to contact with the paper sheet 12 or other wrapper being fed, and as a result, by reference to Fig. 6 it will be observed that the strip of adhesive 332 terminates a short distance from the forward end of each wrapping sheet 12.

From the description thus far it will be observed that during the operation of the machine the wrapper is formed and fed into a position over the folding die, and during the feeding of the wrapper the strip of adhesive has been applied to one marginal edge thereof and the wrapper is thus positioned in readiness to receive the article to be wrapped.

Referring now to Figs. 1, 2 and 3, provision is made for driving the article supporting conveyor 22 intermittently. The article supporting members 20 are arranged to be driven by a chain 400 which runs over the sprockets 402 and 404 at opposite ends of the conveyor. The driving sprocket 402 is secured to a shaft 406 journalled in suitable bearings in the machine frame. A pinion 408 secured to the shaft 406 meshes with a gear 410 free on a stud 412 secured to the machine frame. Intermittent motion is imparted to the gear 410 by the usual Geneva drive including a four point Geneva 414 formed as part of the gear 410 and the usual Geneva driver 416. The driver 416 fixed to a shaft 418 carries a roller 420 at one end which engages in the radial slots 422 in the Geneva. The shafts 418 mounted in suitable bearings 424 in the machine frame is driven from the main cam shaft 50 through bevel gears 426 and 428, as illustrated in Figs. 1 and 2.

The operator places the article to be wrapped over the preforming die 14 and the weight of the article operates to force the wrapping sheet which has as above described been previously positioned over the die down through the die until the article reaches a position such as is illustrated in Fig. 3, in which the article rests upon the article supporting member 20, and in which the side portions of the wrapping sheet project upwardly in a position such as is illustrated in Fig. 7.

Provision is now made for effecting the wrapping of the wrapper about the remainder of the article and to leave the opposite ends thereof in an unfolded condition and to this end a movable folding or wrapping roll 450 and a stationary folding roll 452 are provided as shown in Fig. 3. The movable folding roll 450 which effects the folding of the upstanding end 13 of the wrapper 12 is mounted on the end of a lever 454 secured on a stud 456 journalled in a bracket 458. The bracket 458 is mounted on a slide 460 arranged to slide toward and from the article supporting member 20 in a slide bracket 462. The slide 460 is reciprocated by a cam 464 mounted on the shaft 418, a roller 466 mounted on a lever 468 and connecting link 470. In order to raise the folding roll 450 in its forward stroke toward the article supporting member 20, so that the folding roll 450 will follow a radius described by the rounded corner of the article a stationary cam member 472 secured to the side of the slide bracket 462 cooperates with a roller 474 carried on the end of a lever 476. The lever 476 mounted on the bracket 458 is connected to a lever 478 fixed on the stud 456, by a yieldable link 480 and, as a result, the folding roll 450 is guided into yieldable engagement with the article and the wrapper to fold the upstanding end 13 as illustrated in Fig. 8.

At this time the article supporting member starts its forward motion and as it passes by the stationary roll 452 the remaining upstanding end 15 of the wrapper to which a strip of adhesive has been applied, is folded over and glued to the position shown in Fig. 9. The stationary roll 452 is mounted on one arm of a bell crank 482 which is pivoted on a stud 484 in a bracket 486 secured to the machine frame. The roll 452 is also arranged to follow a radius described by the rounded corner of the article as the article is moved forward and for this purpose a cam 488 is provided. The cam 488 is mounted on the shaft 418 and is arranged to raise the folding roll 452 through connections including a roller 490, a two armed lever 492, link 494 and the other arm 496 of the bell crank.

A plurality of article supporting members 20 are provided on the chain 400 and during the operation of the machine the article is transported on the article supporting members through successive stations A, B, C, D and E where succeeding operations are performed upon the article. The article is deposited onto the article supporting member at station A, where the side folds are performed as described above.

Referring now to Figs. 3, 25, 26, 27 and 30, each article supporting member includes a supporting plate 20 upon which the article and wrapper rest, and the supporting plate is provided with a depending plunger 500, see Fig. 27, which is extended downwardly through a supporting sleeve 502 having a flange portion 504 which is bolted to a plate 506 mounted on ball-bearings 508 interposed between the plate 506 and the upper surface of the main supporting carriage 510 for the article supporting member 20. The main supporting carriage 510 is provided with rollers 512 on opposite sides thereof which are arranged to run in guides or tracks 514 attached to the framework of the machine and following the contour of the conveyor chain 400. The carriage 510 is also provided with pins 516 which are connected by separate links 518 to the conveyor chain 400 so that the conveyor chain operates to drag the carriage 510 and the supporting member 20 carried thereby around with the chain, the weight of the parts being taken by the supporting guideway or track 514 attached to the frame, as illustrated in detail in Fig. 30.

The supporting member 20 is therefore capable of vertical movement with relation to the carriage 510 and the supporting member is presented in its raised position at station A, so that the top of the supporting member 20 will be flush with the top of the wrapper plate 16 when the operator places the article to be wrapped over the forming die 14, as previously described. In order to raise the supporting member to this position the supporting members are provided with guide rollers 520 arranged to run in auxiliary guides or tracks 522 supported on the machine frame at the end of the conveyor immediately preceding station A so that the supporting plate is elevated during the movement of the carriage around the end of the conveyor. As illustrated in detail in Figs. 23 and 29, as the guide rollers 520 leave the track 522 they rest upon a supporting member 524 attached to a pivoted lever 526 connected by a spring 528 to a lug 530 on the machine frame, thereby yieldingly holding the supporting plate 20 in an elevated position ready to receive the wrapper and article to be wrapped. When the article is placed upon the supporting plate 20, the parts are depressed into the dotted line position illustrated in Fig. 28, the spring 528 yielding at such time. This position is illustrated in Fig. 3, and after the folding operations have been performed with the parts in the position illustrated in Fig. 3, then upon subsequent movement of the carriage 510 and article supporting member 20 by the conveyor chain 400, the guide rollers 520 are free and do not re-enter the track until the supporting member 20 arrives at the delivery station E, as will be described. During its movement through the various stations the supporting member 20 is in its lowered position as shown in Fig. 26, the hub 532 on the supporting member 20 resting on the hub 534 of the sleeve 502.

During the movement of the supporting member 20 and carriage 510 into one of the succeeding stations, as will be described, provision is made for effecting the rotation of the supporting member 20 and plate 506 through 90° in order to facilitate the performance upon the article of certain operations, as will be described. In order to connect the supporting member 20 to the plate 506 the supporting member 20 is provided with a depending pin 536 which is arranged to extend through the plate 506. The end portion of the pin extends through an elongated segmental slot 588 in the supporting carriage 510, the construction permitting the relative rotation of the supporting member 20, plate 506 and pin 536 with relation to the supporting carriage 510 through the 90° limits of movement permitted by the segmental slot 538. The supporting member and plate are normally locked to the carriage 510 in the position shown in Fig. 27 and for this purpose a locking pin 540 mounted in a suitable bearing 542 in the supporting carriage 510 is adapted to be moved into and from a locking hole formed in the plate 506 by a stationary elongated cam member 544 which extends lengthwise of the conveyor, as illustrated in detail in Figs. 4, 27, and 30, and cooperates with a cam roll 546 mounted upon the lower end of the locking pin 540.

Referring now to Figs. 3, 25 and 26, after the article 10 and wrapper 12 have been positioned upon the article supporting plate 20 while the latter is in an elevated position as above described, provision is made for wiping the wrapper around the lower corners of the article and upwardly against the sides thereof, and for thereafter firmly clamping the wrapper and article in this position to thereby maintain it in fixed relation to the article supporting plate during the subsequent folding operations to be performed upon it. As herein shown, wiping and clamping members 550 for engaging the opposite sides of the wrapper and article are pivotally mounted upon links 552 and are urged inwardly against stop screws 553 by spring members 554, one end of which engages the under surface of the wiping members 550 and which are coiled around the pivot 556 by which the wiping members are connected to the links, and the second end of which is arranged to extend under a pin 558 on the link 552, as illustrated in Figs. 25 and 26. The link 552 is pivoted upon a rock lever 560 mounted upon a stud 562 carried by a bracket 564, the inward end of which is arranged to slide in retaining grooves 566 formed in the upper surface of the plate 506 above referred to. A clamping screw 568 is provided for retaining the parts in adjusted positions. In order to guide the link 552 and clamping member 550 in its movement when the rock shaft 562 is rocked, as will be described, the link is provided with a roller 570 which moves in a guideway 572 formed in the portion 574 of the bracket 564. The rock shaft 562 is yieldingly urged in one direction by a coil spring 576, one end of which engages a spring stud 578 attached to the bracket 564, the second end of which is connected to a spring stud 580 attached to the shaft 562, as shown in Fig. 26.

Provision is made for locking the parts in their outward position and as herein shown a locking lever 600 pivoted on a stud 602 carries a latch 604 on one arm 606 of the locking lever 600 which engages with a latching member 608 mounted on an arm 610 secured to the rock shaft 562, as shown in Fig. 25. The other arm of the locking lever 600 is normally urged upwardly to hold the latch 604 in its locked position, by a coil spring 612, one end of which is connected to a stud 614 in the lever 600 and the other end being connected to a stud 616 fastened in a stationary stop bar 618 secured to the bracket 564. The lever 600 is provided with a stop screw 620 which comes in contact with the stop bar 618 to limit the upward movement thereof. The lever 600 is also provided with a set screw 622 which is arranged to be depressed by the under surface of the supporting member 20 when the latter is lowered by the article and wrapper being placed thereon. Therefore it will be seen that when the article and wrapper are forced down through the die 14 the side members 550 are released to clamp the article and wrapper to the supporting member 20 and maintain the article in this position during the subsequent operations to be described. Provision is made for resetting the latch members 604 and 608 after the article has been removed from the supporting member 20 and for this purpose arms 624 fixed to the rock shaft 562 are provided with rolls 626 which are arranged to come in contact with resetting cams 628 and 630 secured to the underside of the conveyor, as shown in Fig. 3.

The article is now transported to station B where a hinged presser plate 650 is positioned to rest on top of the article to thereby set the glued flap 15 of the wrapper to the flap 13. The presser plate 650 is secured to a bracket 652 which is pivotally hinged to a bracket 654 on the machine frame by links 656. An extended end 658 on one of the links is arranged to come in contact with a stop screw 660 to limit the downward movement of the plate 650 after the article has passed by. An upturned end 662 of the plate 650 is provided so that the article coming in contact with this end will gradually raise the presser plate to the position shown in Fig. 3.

At the next movement of the conveyor, the article is transported to station C, see Fig. 4, where an operator is stationed to make an end fold, as illustrated in Figs. 10 and 11. During this movement from station B to station C the supporting member is arranged to be turned on its axis 90° to thereby present the article in a convenient position for the operator to make the end fold.

In order to effect the rotation of the supporting plate 20 with relation to the carriage 510 to turn the article through 90° the sleeve 502 is provided with a lever 664 secured thereto connected by a link 666 connected to a lever 668 provided with a cam roll 670. The cam roll 670 is arranged to engage a cam path 672 in a stationary plate 674 attached to a cross member 676 and extending lengthwise of the conveyor supporting framework, see Figs. 30 and 31, so that upon movement of the cam roll 670 through the linkage described the sleeve 502 is arranged to be oscillated through 90°. Referring now to Fig. 27, it will be observed that as the sleeve 502 is oscillated the pin 536 transmits the movement to the supporting plate 20, so that the supporting plate 20 and sleeve 502 turn as a unit through 90°. The locking pin 540, see Fig. 27, is arranged to be disengaged from the plate 506, before the turning movement takes place and for this purpose a second roll 700 is provided on the locking pin 540 which is arranged to engage with a cam piece 702, see Fig. 4, mounted above the supporting cam 544, to thereby force the roll 700 and pin 540 downwardly, to the level of the supporting cam 544.

After the end fold has been made at station C the operator places a glued tab 710 over the folded end 712 and the top of the wrapper to thereby secure the end in a folded condition against the wrapper, as illustrated in Fig. 11. The glued tab 710 is preferably supplied by a unit 714, of known construction which may be purchased in the market, mounted on a bracket 716 secured to the machine frame.

The article is next transported to station D, where another operator performs a similar end fold on the remaining unfolded end. The completely wrapped article is now ready for delivery onto a delivery belt 720, see Fig. 5, but first the supporting member 20 is again rotated back to its normal position by the stationary cam 672 as illustrated in Fig. 1.

At this time the locking pin 540 is again urged into engagement with the plate 506 by a raised portion 722 of the elongated cam 544.

In order to release the completely wrapped article to be delivered to the belt 720 the supporting member 20 is again elevated to the position shown in Fig. 5, at station E. For this purpose stationary elevating cams 724 are provided so that when the rolls 520 come in contact with the cams 724 the article supporting plate and the article carried thereby will be elevated into a position to clear the clamping members 550. Upon subsequent movement of the carriage 510 the article is presented to a position where guide strips 726 may enter the grooves 728 formed in the supporting plate 20, see Fig. 27, to transfer the article to the conveyor 720. The guide rollers 520 on the supporting plate 20 are now caused to enter a second auxiliary track or guide 750 by the cam 724 and is supported in its travel on the underside of the conveyor by the elongated supporting bar 752 as shown in Fig. 30.

In the practical use of the illustrated machine, the sizes of the articles to be wrapped may vary from time to time, and by reference to Figs. 25 and 26, and to the foregoing description thereof, it will be observed that the clamping members 550 are so mounted as to be capable of self-adjustment to the varying sizes of articles. In addition, the folding rolls 450 and 452 are made wide enough to accommodate a maximum width of article and are mounted in such manner as to be not only yieldingly urged against the article to press the wrapper thereagainst, but also may adjust themselves automatically for operation upon articles of varying heights within the limits for which the machine is designed. This feature of the machine eliminates the necessity for adjustment of the article clamping mechanism upon variation in the size of the articles deposited on the article supporting member.

While the preferred embodiment of the invention has been herein illustrated and described, it will be understood that the invention may be embodied in other forms within the scope of the following claims.

Having thus described the invention, what is claimed is:—

1. In a machine for handling and wrapping heavy and bulky articles, in combination, a plurality of article supporting members, an endless conveyor upon which the article supporting members are mounted at spaced intervals, means for elevating an article supporting member, wrapper feeding mechanism adapted to feed a wrapper into a position over the article supporting member, wrapper folding mechanism for folding two sides and the top sections of the wrapper including an open die through which the wrapper and article are permitted to pass when the article supporting member is lowered, folding mechanism carried by and movable with the article supporting member for clamping two of the opposite sides of the wrapped article upon the article supporting member, and means for folding inwardly the upper sections of the wrapper upon the top of the article.

2. In a machine for handling and wrapping heavy and bulky articles, in combination, a conveyor, an article supporting member carried thereby, means for feeding a wrapper into a position over the article supporting member, an open die separate from said conveyor and disposed over the article supporting member through which the wrapper is caused to pass to be folded upwardly against two sides of an article positioned upon the article supporting member, means under the control of the operator for adjustably regulating the position of the wrapper with relation to the die, and means for retaining the partially wrapped article upon the article supporting member to permit the same to be moved into succeeding stations to permit successive folding operations to be performed thereon, said conveyor having provision whereby the article is retained in an upright position during its passage through the machine to facilitate the wrapping thereof.

3. In a machine for handling and wrapping heavy and bulky articles, in combination, means for forming and feeding a wrapper comprising two sets of positively driven feed rolls, a cutter member operative between said feed rolls, transfer mechanism arranged to reciprocate through a predetermined stroke and adapted to engage and feed a wrapper formed by the cutter, said feed rolls and transfer mechanism being timed to form a loop in the wrapper, and gripping mechanism adapted to engage and grip a wrapper presented by the transfer mechanism to feed the same into a predetermined position, an article supporting member positioned to support an article upon a wrapper thus fed into the aforesaid predetermined position, folding instrumentalities operative to fold two of the opposite sides of the wrapper about the article and upon the top thereof while the latter is supported upon the article supporting member, including an open die, and means for moving said article supporting member downwardly to cause the article and wrapper to pass downwardly through said die through which said article supporting member is arranged to pass, and separate means disposed below said die for moving the article supporting member through successive stations to permit subsequent folding operations to be performed thereon.

4. In a machine for handling and wrapping heavy and bulky articles, in combination, a plurality of article supporting members, an elongated conveyor for moving the article supporting members through successive stations, an open folding die positioned above the conveyor at one station, means for elevating the article supporting member into a position to receive a wrapper and an article, means for lowering said article supporting member to cause the article and wrapper to pass downwardly through said die, folding instrumentalities carried by the article supporting members and movable therewith for folding two sides of the wrapper upwardly about the article and for retaining the article upon the article supporting member during movement through successive stations.

5. In a machine for handling and wrapping heavy and bulky articles, in combination, a plurality of article supporting members, an elongated conveyor for moving the article supporting members through successive stations, an open folding die positioned above the conveyor at one station, means for moving the article supporting member into an elevated position to receive a wrapper and an article, means for moving said article supporting member downwardly to cause the article and wrapper to pass through said die, folding instrumentalities for folding two sides of the wrapper upwardly about the article and for holding the article upon the article supporting member during movement through successive stations, and means for effecting elevation of the article supporting member to eject the wrapped article from the machine, said conveyor having provision whereby the article is retained in an upright position during its passage through the machine to facilitate the wrapping thereof.

6. In a machine for handling and wrapping heavy and bulky articles, in combination, a plurality of article supporting members, an elongated conveyor for moving the article supporting members through successive stations, an open folding die positioned above the conveyor at one station, means for elevating the article supporting member into a position to receive a wrapper and an article, means for moving said article supporting member downwardly to cause the article and wrapper to pass through said die, folding instrumentalities carried by the article supporting members and movable therewith for folding two sides of the wrapper upwardly about the article and for retaining the article upon the article supporting member during movement through successive stations, and means for effecting disengagement of the folding instrumentalities from the article in order to permit the article to be discharged from the machine.

7. In a machine for handling and wrapping heavy and bulky articles, in combination, a plurality of article supporting members, an elongated conveyor for moving the article supporting members through successive stations, an open folding die positioned above the conveyor at one station, means for elevating the article supporting member into a position to receive a wrapper and an article, means for moving said article supporting member downwardly to cause the article and wrapper to pass through said die, a pair of clamping members mounted to move with said article supporting member, and means actuated by the downward movement of the article supporting member for moving the clamping members inwardly into clamping engagement with the sides of the article supported upon the article supporting member.

8. In a machine for handling and wrapping heavy and bulky articles, in combination, a plurality of article supporting members, an elongated conveyor for moving the article supporting members through successive stations, an open folding die positioned above the conveyor at one station, means for elevating the article supporting member into a position to receive a wrapper and an article, means for moving said article supporting member downwardly to cause the article and wrapper to pass through said die, folding means for holding the two sides of the wrapper upwardly about the article and over upon the top thereof, said means including clamping members for clamping the sides of the article to fold the wrapper snugly thereabout, a movable folding member for engaging and folding the rearward side of the wrapper upon the top of the article, and a folding member in the path of movement of the article as it is conveyed by the elongated conveyor for folding down the opposite side of the wrapper upon the top of the article, said conveyor having provision whereby the article is retained in an upright position during its passage through the machine to facilitate the wrapping thereof.

9. In a machine for handling and wrapping heavy and bulky articles, in combination, a plurality of article supporting members, an elongated conveyor for moving the article supporting members through successive stations, an open folding die positioned above the conveyor at one station, means for elevating the article supporting member into a position to receive a wrapper and an article, means for moving said article supporting member downwardly to cause the article and wrapper to pass through said die, folding instrumentalities carried by the article supporting members and movable therewith for folding two sides of the wrapper upwardly about the article and for retaining the article upon the article supporting member during movement through successive stations, and means for pressing down the folded portions of the wrapper upon the top of the article at a succeeding station.

10. In a machine for handling and wrapping heavy and bulky articles, in combination, a plurality of article supporting members, an elongated conveyor for moving the article supporting members through successive stations, a folding die positioned above the conveyor at one station, means for elevating the article supporting member into a position to receive a wrapper and an article passing downwardly through said die, folding means for folding the two sides of the wrapper about the article and over upon the top thereof, means for effecting the rotations of the article through ninety degrees during movement thereof by the elongated conveyor to present the article in a position to facilitate the folding of the ends thereof, and means for thereafter rotating the article in the reverse direction through ninety degrees, said conveyor having provision whereby the article is retained in an upright position during its passage through the machine to facilitate the wrapping thereof.

11. In a machine for handling and wrapping heavy and bulky articles, in combination, a plurality of article supporting members, an elongated conveyor for moving the article supporting members through successive stations, a folding die positioned above the conveyor at one station, means for elevating the article supporting member into a position to receive a wrapper and an article passing downwardly through said die, folding means for folding the two sides of the wrapper about the article and over upon the top thereof, means for effecting the rotations of the article through ninety degrees during movement thereof by the elongated conveyor to present the article in a position to facilitate the folding of the ends thereof, means for thereafter rotating the article in the reverse direction through ninety degrees, and means for thereafter elevating the article supporting member and for ejecting the wrapped article from the machine.

12. In a machine for handling and wrapping heavy and bulky articles, in combination, an article supporting member, means for feeding a wrapper into a position over the article supporting member, an open die over the article supporting member through which the wrapper is caused to pass to be folded upwardly against two sides on an article positioned upon the article supporting member, and self-adjusting means for holding the upwardly extending sides of the wrapper against the article and for retaining the article on the article supporting member, and an elongated conveyor upon which said article supporting member is mounted.

13. In a machine for handling and wrapping heavy and bulky articles, in combination, an article supporting member, means for feeding a wrapper into a position over the article supporting member, an open die over the article supporting member through which the wrapper is caused to pass to be folded upwardly against two sides on an article positioned upon the article supporting member, and self-adjusting means carried by the article supporting member for clamping an article thereon, said means having provision for automatically adapting itself to varying sizes of articles, and an elongated conveyor upon which said article supporting member is mounted.

14. In a machine for handling and wrapping heavy and bulky articles, in combination, an article supporting member, means for feeding a wrapper into a position over the article supporting member, an open die over the article supporting member through which the wrapper is caused to pass to be folded upwardly against two sides of an article positioned upon the article supporting member, and self-adjusting means including folding rolls and clamping members for folding the wrapper against the article, said means having provision for automatically adapting themselves to varying sizes of articles, and an elongated conveyor upon which said article supporting member is mounted.

SAMUEL B. FIELD.